(12) United States Patent
Bradley et al.

(10) Patent No.: US 9,571,653 B1
(45) Date of Patent: Feb. 14, 2017

(54) STREAMLINED CALL MANAGEMENT AND ROUTING SYSTEM

(71) Applicant: INTERNATIONAL BUSINESS MACHINES CORPORATION, Armonk, NY (US)

(72) Inventors: Lisa M. Bradley, Cary, NC (US); Aaron J. Quirk, Cary, NC (US); Lin Sun, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/226,225

(22) Filed: Aug. 2, 2016

(51) Int. Cl.
*H04M 3/00* (2006.01)
*H04M 5/00* (2006.01)
*H04M 3/523* (2006.01)
*H04M 3/51* (2006.01)
*H04M 3/42* (2006.01)

(52) U.S. Cl.
CPC ......... *H04M 3/523* (2013.01); *H04M 3/42059* (2013.01); *H04M 3/5166* (2013.01)

(58) Field of Classification Search
CPC ................. H04M 2201/40; H04M 2203/2077; H04M 3/428; H04M 3/493; H04M 2203/408
USPC ............ 379/265.01, 265.02, 265.05, 265.11, 379/266.01, 88.2, 88.01, 88.18
See application file for complete search history.

(56) References Cited

U.S. PATENT DOCUMENTS

| | | |
|---|---|---|
| 5,835,571 A | 11/1998 | Johnson |
| 6,061,433 A | 5/2000 | Polcyn et al. |
| 6,990,189 B2 * | 1/2006 | Ljubicich .......... H04M 3/42008 379/201.01 |
| 7,386,103 B1 | 6/2008 | Chahal |
| 7,616,759 B2 | 11/2009 | Kucera et al. |
| 8,218,533 B2 | 7/2012 | Vashisht et al. |
| 8,553,860 B1 | 10/2013 | Bhogal et al. |
| 8,831,195 B2 | 9/2014 | Gilzean et al. |
| 8,923,505 B2 | 12/2014 | Mergen |
| 9,386,151 B2 * | 7/2016 | Berger ................. H04M 3/428 |
| 2011/0096914 A1 | 4/2011 | Eng et al. |
| 2013/0254720 A1 | 9/2013 | Qi |
| 2014/0334613 A1 | 11/2014 | Awad et al. |
| 2014/0348316 A1 * | 11/2014 | Berger .................. H04M 3/428 379/210.01 |

* cited by examiner

*Primary Examiner* — Thjuan K Addy
(74) *Attorney, Agent, or Firm* — Weitzman Law Offices, LLC

(57) ABSTRACT

A system for managing and routing calls involves a switch, multiple endpoints, an IVR system; and storage including a data structure associating individual unique keys with ANI information and one of the endpoints. In response to receipt of a call, identified by a specific ANI, the IVR will allow the user to input a routing key. If the user does not provide the routing key, it will follow the user's interaction to one of the endpoints, and I) generate a unique key, II) store the unique key, the specific ANI and an identifier of the one of the endpoints, and III) make the unique key available so that, the user can provide the unique key as the routing key on a subsequent call. If the user does provide the routing key, the specific ANI will be verified and the user's call routed to the endpoint associated with the routing key.

1 Claim, 3 Drawing Sheets

STREAMLINED CALL MANAGEMENT AND ROUTING SYSTEM

FIELD OF THE INVENTION

This disclosure relates generally to telecommunications and, more particularly, to call management and routing systems.

BACKGROUND

The use of interactive voice response systems for call management, routing and distribution has become ubiquitous. Such systems enable a caller to navigate a series of menus to reach the endpoint they want, for example, sales, customer service, make an appointment, check an account balance or billing date, etc. However, it can be frustrating for a caller to call a number that they call fairly often and have the interactive voice response ("IVR") system notify the caller that "some of our selections may have changed." Since the caller does not know whether, in fact, the selections that will take them where they want to be connected have changed since their last call, they are either forced to waste time going through the voice or key-press prompts to get to where they want or, if they have memorized the sequence to get them where they want, try the sequence only to find that the prompts have actually changed and so they did not end up where they wanted.

Still further, for systems that deal with people's personal information, for example, medical offices, banks, brokerages, etc., an IVR may initially prompt the caller for identification information even though the caller is not interested in anything where that information would be needed. Moreover, in some cases, even if the caller initially inputs their information because it will be needed, they may be required to provide it again at the location where they end up.

In most cases, the only other way that someone can bypass the above problem with most IVR systems is to, for example, repeatedly press "0" or say "operator" or the like so that they get connected to a person and then can ask to be directly connected to where they want. However, that approach can actually take more time than navigating the IVR prompts and, in some cases, the transfer by the person merely places the caller back into the IVR system.

Thus, there is an ongoing technological problem involving IVR technology involved in managing and routing calls. Specifically, there is a problem with how such systems handle certain calls and significant room for improvement in the operation of such systems, particularly with respect to systems where the same callers may call multiple times over some time span, in some cases for the same reason and in other cases for different reasons.

SUMMARY

One aspect of this disclosure involves a system for managing and routing calls from users. The system includes a telephonic interface switch via which incoming phone calls are received; an automatic call distributor (ACD) coupled, via the telephonic interface switch, to multiple function endpoint stations; an interactive voice response (IVR) system, coupled to the ACD, the IVR including at least one processor; and storage, accessible by the at least one processor of the IVR system, the storage including at least one data structure associating individual unique keys with both automatic number identification (ANI) information and one of the multiple function endpoint stations. The system operates so that, in response to receipt of an incoming call from a user's telephone, identified by a specific ANI, the processor will cause the IVR to provide the user with an option to input a routing key, and a) if the user does not provide the routing key, will follow the user's interaction with the IVR to connect the user to one of the multiple function endpoint stations, and upon connection of the user to the one of the multiple function endpoint stations, will: I) generate a unique key, II) store, in the storage, the unique key, the specific ANI information and an identifier of the one of the multiple function endpoint stations, and III) make the unique key available for provision to the user so that, if a subsequent call is received from the user, the user can provide the unique key as the routing key, and b) if the user does provide the routing key, will access the storage to locate the routing key and verify the associated stored ANI against the ANI for the incoming call from the user, and if the ANI verifies, will route the user's call to the one of the multiple function endpoint stations associated with the routing key without requiring further routing interaction between the user and the IVR.

Advantageously, our system improves the functioning of an IVR-containing system and reduces caller frustration. Moreover, our system's operation streamlines IVR operation.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure provides a technical solution to address the aforementioned problems inherent with call management and routing systems. Our technical solution improves upon IVR technology within such systems because it allows a user to bypass IVR prompts when they are re-calling for a particular reason but not bypass the IVR prompts when they are calling for a reason for which they have not previously called.

Figure 1:
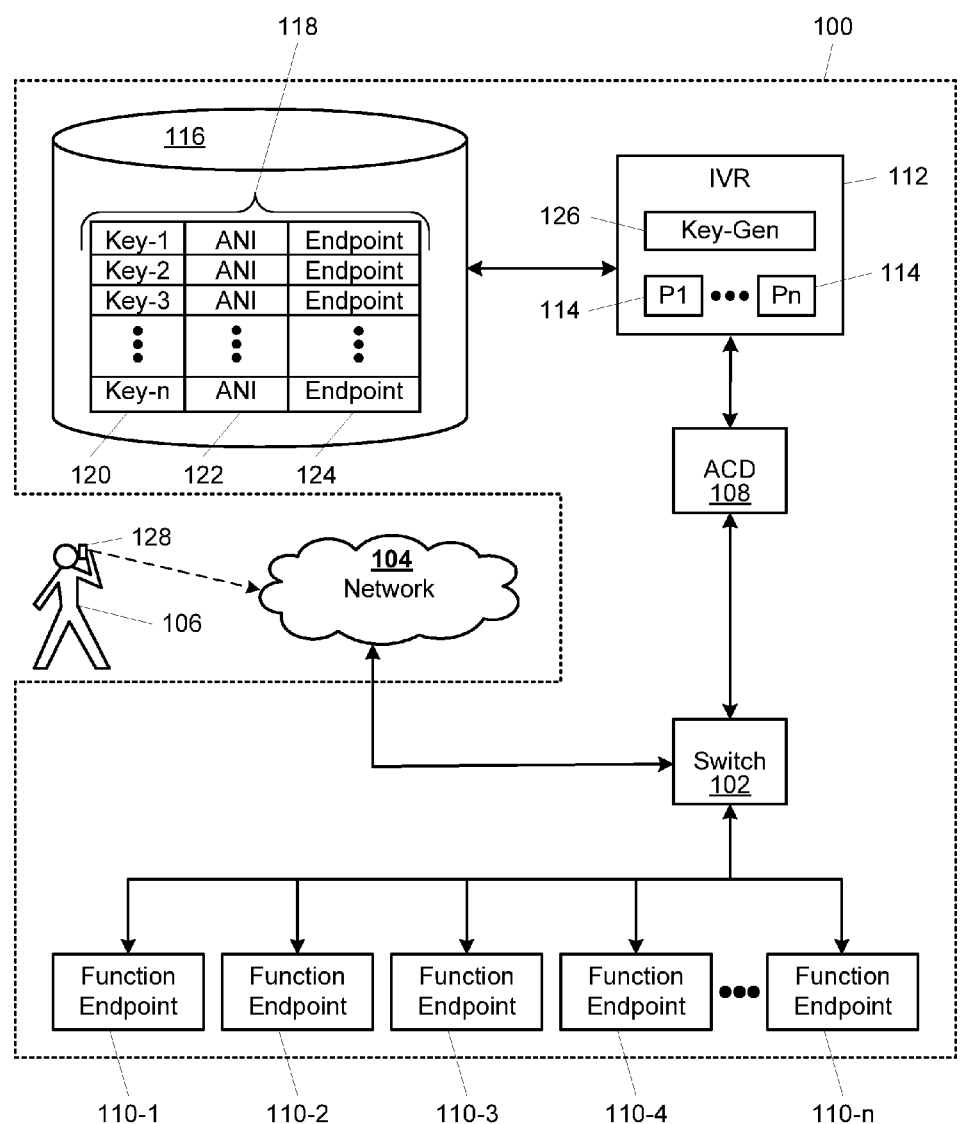
FIG. 1 illustrates, in simplified form, one example system 100 constructed to operate as described herein.

FIG. 1 illustrates, in simplified form, one example system 100 constructed to operate as described herein.

The system 100 includes a telephonic interface switch 102 connected to a network 104, for example, a conventional telephone network, a cellular network, a network over which VoIP, WiFi or other internet-based calls can pass, etc. via which it can receive calls from callers 106. The system 100 also includes an automatic call distributor (ACD) 108 that is coupled, via the telephonic interface switch 102, to multiple function endpoint stations 110-1, 110-2, 110-3, 110-4, . . . , 110-*n*. Each of the function endpoint stations 110-1, 110-2, 110-3, 110-4, . . . , 110-$n$ is an ending point for some function that a caller 106 may wish to reach. Depending upon the particular implementation, each such endpoint station 110 may be where a caller 106 can be connected to, for example, check an account balance, make an appointment, initiate or cancel a transaction, and each may be automated or staffed by a live person as appropriate. In addition, each endpoint station 110 may be constructed to concurrently handle multiple calls using, for example, multiple extensions. Thus, a function endpoint 110 may be made up of a single callable line/extension, or it may be made up of many lines/extensions. The system 100 further includes an interactive voice response (IVR) 112 system that is coupled to the ACD 108. The IVR 112 includes at least one, and potentially more, processor(s) 114 as well as programming for unique key generation 126 as described below.

Finally, the system 100 includes storage 116 that is accessible by the processor(s) 114. Note here that, unless expressly stated otherwise herein, any reference to "storage" is intended to mean any storage medium that stores data, data-containing structures, and program instructions in a non-transitory manner, for example, such as non-transient solid state memory, a magnetic hard drive, a CD or DVD, a tape drive, or an analogous or equivalent storage medium type would. The storage includes at least one data structure 118, which may be as simple as a single table or something more complex like a database, or even a distributed database. The data structure 118 associates individual unique keys 120 with both automatic number identification (ANI) information and one of the function endpoint stations 110-1, 110-2, 110-3, 110-4, . . . , 110-$n$.

Since, in general, telephonic interface switches, ACD systems and IVR systems are well known. For simplicity, the construction and details of each will not be described. Other than to note that unlike current conventional IVRs, IVRs 112 used in a system 100 constructed as described herein will specifically include modified programming that will cause their processor(s) 114 to operate as will now be described.

Having described the various components of the system 100, the operation of the system will now be described with reference to FIG. 2 and continuing reference to FIG. 1.

Figure 2:
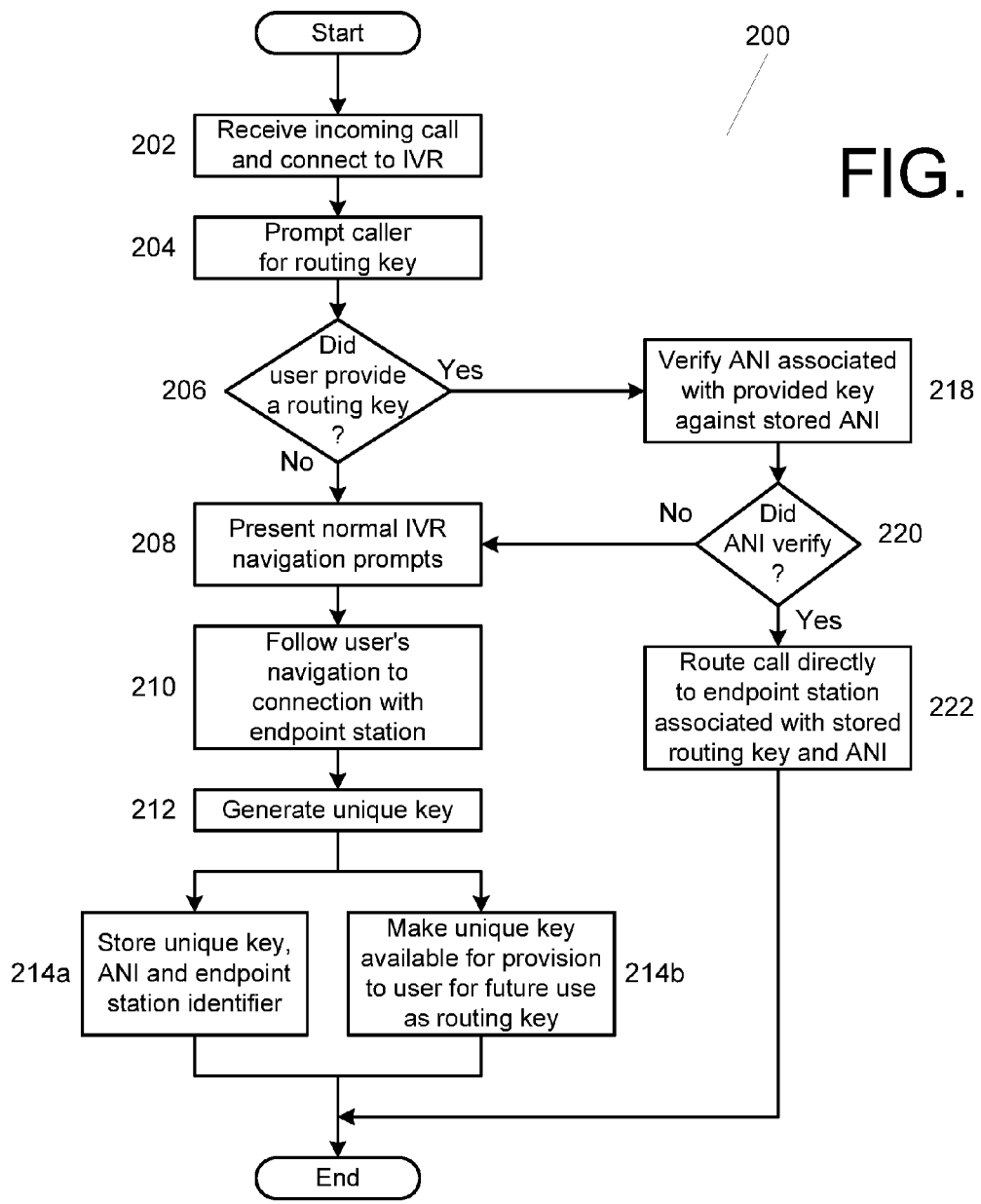
FIG. 2 is a flowchart for one example implementation of our improvement to IVR technology and operation.

FIG. 2 is a flowchart 200 for one example implementation of our improvement to IVR technology and operation. It is to be understood that all of the following operations are performed by one or more processor(s) executing appropriate programming and, more specifically, operations of the IVR 112 will be performed, under program control, by the processor(s) 114 of the IVR 112.

The operation begins with receipt of an incoming call from a user's 106 telephone 128 (which may be a land line, a mobile phone, a VoIP phone, etc) at the switch 102 which connects the call to the ACD 108 which, in turn, routes the call to the IVR 112 (Step 202). Upon receipt of the ANI for the call, the IVR 112 will prompt the caller for a routing key (Step 204). Depending upon the particular implementation, the IVR 112 may present a dialog along the lines of, for example, "If you have a direct connection code, you may input it now" or "If you have previously called and wish to be connected directly to {that prior function/person/etc.} please input the connection key you were provided" as the prompt. Of course, any appropriate dialog can be used.

Next, the IVR 112 waits some specified time to allow the user to input the routing key (Step 206).

At this point, presume for purposes of explanation that this user 106 is a first time caller, so they have no routing key to provide. Since the user did not provide a routing key, the user is provided with the normal navigation prompts, e.g., "For appointments, press or say "1", for billing, press or say "2", . . . , to return to the previous menu press "9", to hear these choices again, press "*" (Step 208).

The IVR 112 then "follows" the user's 106 navigation through the IVR's 112 menus until the user connects with one of the function endpoint stations 110 (Step 210).

At this point it should be noted that, although the IVR 112 has "followed" the user's navigation, it does not care about a caller's path through the prompts (also sometimes referred to as the "context") at all, which is in sharp contrast to some current IVR systems that allow a caller to return to a "session" in progress, for example, if they are disconnected. Rather the instant IVR 112 only cares about the particular function endpoint station 110 to which the user is ultimately connected.

Once the user 106 has reached a specific function endpoint station 110, the IVR 112 will generate a unique routing key (Step 212). At this point it should be noted first that, since the routing key will be associated with a particular ANI, which is itself unique, depending upon the particular implementation, the routing key need not be unique to the entire system, instead, in some implementations it can only be unique for that particular function endpoint station 110. Additionally, or alternatively, the routing key can be generated simply from the dialing keys available on a conventional phone (i.e., "0" to "9" and possibly "*" and/or "#" too), or, if the system is configured to only allow the routing key to be input by voice, it can be any combination of digits and letters. Likewise, the length of the routing key will depend upon the particular implementation. In this regard, advantageously, with our approach, it is possible to easily expand the size of the routing key if needed while retaining any shorter routing keys that are currently active. Likewise, in some implementations, the IVR 112 can advantageously be set up to automatically expire and re-use routing keys after some suitably long period of time (which may be implementation dependent and may be ascertained by tracking usage over time within the system, for example, routing keys are used by callers regularly within a few months, are rarely used by callers after eight months and have never been used after passage of a year, so recycling can be performed for any routing key that has not been used for a year or more).

Advantageously, to make sure that the call reached the right function endpoint station 110, the IVR 112 may wait until the user 106 begins interacting with the function endpoint station 110, if automated, or, if attended by a person, for some action by that person to indicate that this is the correct endpoint. For example, the user may call an airline to purchase tickets and navigate to international ticketing instead of domestic ticketing and have to be transferred. By waiting, the IVR 112 can easily account for such an error.

Once the unique (i.e., routing) key has been generated, in any order or concurrently, the IVR 112 will store the unique key 120 associated with both the ANI 122 for the caller and an identifier 124 of the function endpoint station 110 to which the user was ultimately connected (Step 214$a$), and it will make the unique key available to be provided to the user 106 for future use as the routing key (Step 214$b$), for example, along with an explanation of how it can be used, at which point thereafter, the process will be complete.

At this point it is worth noting a further advantage from our approach. Since the IVR 112 only cares about the function endpoint station 110 the user ended up at and merely stores an identifier for that function endpoint station 110. As a result, if, for example, the IVR menu items change but the function endpoint stations 110-1, 110-2, 110-3, 110-4, . . . , 110-*n* stay the same, the menu changes will not affect the routing to that station when a particular routing key and ANI combination identifies one of those function endpoint stations 110-1, 110-2, 110-3, 110-4, . . . , 110-*n*. Likewise, if any of the function endpoint stations 110-1, 110-2, 110-3, 110-4, . . . , 110-*n* change, for example, because a new feature was added, a department expanded or contracted, an individual changed extensions, etc., such change(s) can easily be accommodated by merely changing the identifier(s) in the endpoint 124 section of the data structure 118 in the storage 116.

Now, presume that the user referred to above, whose ANI is 212-555-9876 called the medical group office to make an appointment with their physical therapist, Ms. Ng, ultimately reached the function endpoint station 110 for "make an appointment with Ms. Ng." Once the appointment was made, presume that the user received a routing key, for example "551264", which was stored in the data structure 118 along with the ANI of 2125559876 and an identifier, for example, "F63" for the function endpoint station 110 for "make an appointment with Ms. Ng"

Again with reference to FIG. 2, two weeks later, the user calls the medical group main office number and is connected to their IVR where the user is prompted (Step 204), "Welcome to Healthy Medical Group. If you have a direct connection key you may enter it now. Otherwise, please listen to the following menu to help us direct your call." In this case, the user enters "551264" in response.

The IVR 112 then, using a processor 114, accesses the storage 116 and locates the corresponding routing key of "551264" in the routing key part 120 of the data structure 118. It then compares the associated stored ANI against the ANI for the incoming call by the user to verify that the two are the same (Step 218). If for some reason, the ANI did not verify (Step 220), in this example process flow, the normal IVR 112 navigation menu would be presented (Step 208). At this point it should be noted that, for variants where the routing key is not unique except in conjunction with the ANI, the IVR may locate multiple instances of that routing key and, in such a circumstance, would compare the ANI against the corresponding stored ANI information for each. If one of the instances contained the routing key and the corresponding ANI, that endpoint identifier would be used.

In this case, we presume that there is only one routing key that matches and that the stored ANI and caller's current ANI match, so the ANI has verified (Step 220). As a result, the IVR 112 has the ACD 108 route the call directly to the function endpoint station 110 ( ) designated by the corresponding endpoint identifier, e.g., "F63" so the user can now make an appointment without needing to go through the menu routing prompts.

Note again here that the call "context" is not retained from the prior call and, had the user not provided the routing key, for example because they were calling to speak with someone in the billing office, contact the pharmacy, etc., they would have had to navigate the IVR prompts even though their ANI was stored associated with a routing key.

At this point it should be understood that some implementations can allow multiple ANIs to be stored associated with a routing key, for example, the ANI for both a caller's cell phone and land line. In such a case, the verification would compare the ANI for the current call against all of the stored ANIs and, if any one of them verified, the ANI would be verified. This could be accomplished by, for example, providing an automated message that provides the routing key and then asks if the caller wishes to add another number that they may call from in the future.

Likewise, it should be understood that some implementations can have multiple routing key instances each associated with the same ANI, for example, because the user called for different purposes each time. Thus, if the user calls at some later time for one of those purposes, they merely need to provide the proper routing key and they will be directly connected without the IVR requiring any further routing interaction.

Advantageously, with implementations that allow multiple ANIs to be associated with a specific routing key, the user can then share the routing key with others by providing their phone number(s) and then sharing the routing key with them so that those others can take advantage of the IVR bypass to particular function endpoint stations well.

Of course, it is well known that IVR systems are routinely used by entities that also deal with personal information, for example, banks, brokerage houses, medical offices, insurance carriers, etc., with the individual having an associated identification number (e.g., account number, policy number, patient ID, social security number, etc.). Advantageously, with our approach, the need for that information in order to assist a particular individual does not preclude having routing keys that can be shared among multiple people.

Figure 3:
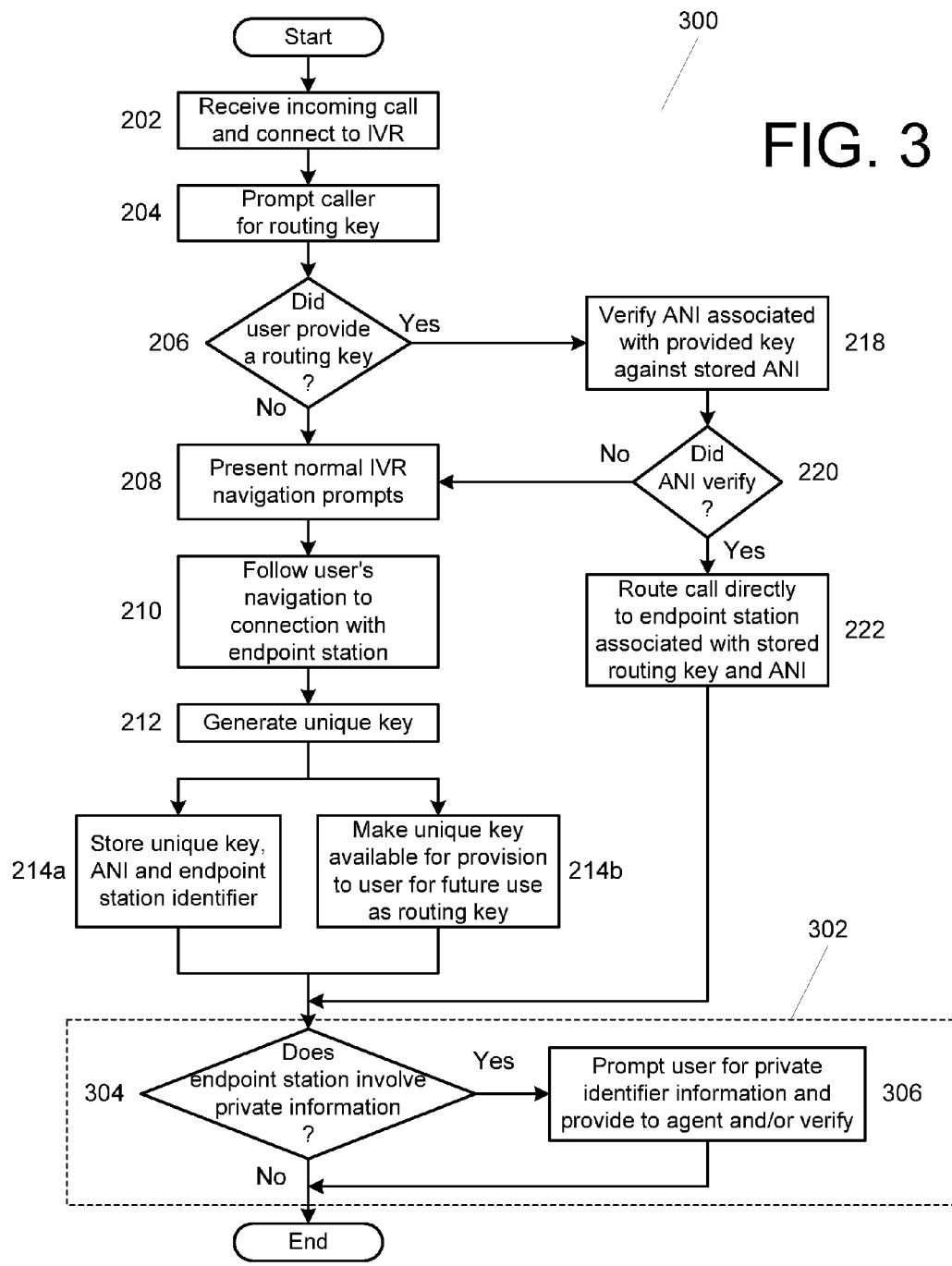
FIG. 3 is a flowchart for another example implementation of our improvement to IVR technology and operation.

FIG. 3 is a flowchart 300 for another example implementation of our improvement to IVR technology and operation that can be used for circumstances where one or more of the function endpoint stations will involve private information and, thus, will require a caller to provide some form of private identifier information, for example, an associated identification number (e.g., account number, policy number, patient ID, social security number, etc.) and/or other information (e.g., date of birth, mother's maiden name, an answer to a security question, etc.).

As shown, FIG. 3 is identical to FIG. 2, except that it adds a security module 302 to the end of the process for any function endpoint station 110 that will require private identifier information. Advantageously, by placing this aspect at the end of the process, anyone with the right combination of routing key and ANI can reach the endpoint associated with them—irrespective of whether that function endpoint station 110 will require any form of private identifier information.

Thus, as shown in FIG. 3, following Step 214*a*, Step 214*b* or Step 222, at such a function endpoint station 110, the IVR 112 will determine whether the specific endpoint station will involve private identifier information (Step 304). If not, the process ends. If so, the IVR 112 will proceed to prompt the user for the appropriate private identifier information and, once received, will provide it to the agent at that endpoint station 110 or, if an automated endpoint station verify it (or pass it on to some other verification process) (Step 306). Then, from the standpoint of the instant invention variants, the process is complete.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A system for managing and routing calls from users comprising:

i) a telephonic interface switch via which incoming phone calls are received;

ii) an automatic call distributor (ACD) coupled, via the telephonic interface switch, to multiple function endpoint stations;

iii) an interactive voice response (IVR) system, coupled to the ACD, the IVR including at least one processor; and iv) storage, accessible by the at least one processor of the IVR system, the storage including at least one data structure associating individual unique keys with both automatic number identification (ANI) information and one of the multiple function endpoint stations;

v) wherein, in response to receipt of an incoming call from a user's telephone, identified by a specific ANI, the processor will cause the IVR to provide the user with an option to input a routing key, and a) if the user does not provide the routing key, will follow the user's interaction with the IVR to connect the user to one of the multiple function endpoint stations, and upon connection of the user to the one of the multiple function endpoint stations, will I) generate a unique key, II) store, in the storage, the unique key, the specific ANI information and an identifier of the one of the multiple function endpoint stations, and III) make the unique key available for provision to the user so that, if a subsequent call is received from the user, the user can provide the unique key as the routing key; and b) if the user does provide the routing key, will access the storage to locate the routing key and verify the associated stored ANI against the ANI for the incoming call from the user, and if the ANI verifies, will route the user's call to the one of the multiple function endpoint stations associated with the routing key without requiring further routing interaction between the user and the IVR.

\* \* \* \* \*